(12) United States Patent
Li (10) Patent No.: US 8,589,588 B2
(45) Date of Patent: Nov. 19, 2013

(54) METHOD OF IDENTIFYING DOMAIN-TO-DOMAIN LINK BASED ON AUTOMATICALLY SWITCHED OPTICAL NETWORK

(75) Inventor: Wang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1632 days.

(21) Appl. No.: 11/791,154

(22) PCT Filed: Nov. 17, 2005

(86) PCT No.: PCT/CN2005/001942
§ 371 (c)(1),
(2), (4) Date: Sep. 10, 2007

(87) PCT Pub. No.: WO2006/053498
PCT Pub. Date: May 26, 2006

(65) Prior Publication Data
US 2008/0170854 A1     Jul. 17, 2008

(30) Foreign Application Priority Data
Nov. 19, 2004   (CN) .......................... 2004 1 0086651

(51) Int. Cl.
*G06F 15/173* (2006.01)
*H04L 12/28* (2006.01)
(52) U.S. Cl.
USPC ............................. 709/238; 370/254; 370/255
(58) Field of Classification Search
USPC .......................................................... 709/238
See application file for complete search history.

(56) References Cited

U.S. PATENT DOCUMENTS

| 6,456,600 | B1 * | 9/2002 | Rochberger et al. .......... 370/255 |
| 7,065,085 | B2 * | 6/2006 | Shin et al. ...................... 370/392 |
| 7,215,644 | B2 * | 5/2007 | Wu et al. ........................ 370/248 |
| 2004/0085961 | A1 * | 5/2004 | Coffell et al. ................. 370/392 |
| 2005/0089047 | A1 * | 4/2005 | Ould-Brahim et al. .. 370/395.53 |

FOREIGN PATENT DOCUMENTS

CN           1529429          9/2004

OTHER PUBLICATIONS

Supplementary European Search Report from European Patent Application 05808304.

(Continued)

*Primary Examiner* — David X Yi
(74) *Attorney, Agent, or Firm* — Conley Rose, P.C.; Grant Rodolph (57) ABSTRACT

A method of identifying domain-to-domain link based on ASON (Automatically Switched Optical Network), including: storing, by a node in ASON, a route control ID of an abstract node each high layer network; obtaining, by the node, the route control ID of the abstract node in each network layer stored in an opposite terminal node with an exchanging method; comparing, by the node, the route control ID of the abstract node in each network layer stored locally with the route control ID of the abstract node in a corresponding network layer stored in the opposite terminal node respectively, and determining whether the link between the node and the opposite terminal node is a domain-to-domain link according to the comparing result. With the invention, the control domain of each layer in a hierarchical ASON can identify the domain-to-domain link between the nodes in the present layer.

14 Claims, 5 Drawing Sheets

(56) References Cited

OTHER PUBLICATIONS

Sanchez-Lopez S. et al. "PNNI-based control plane for automatically switched optical networks" Journal of Lightwave Technology, XX, XX, vol. 21, No. 11, Nov. 2003, pp. 2673-2682, XP011103945 ISSN: 0733-8724.

Draft ITU-T Recommendation G. 7715/Y.1706: "Architecture and requirements for routing in the automatically switched optical network" International Telecommunications Union, May 21, 2002, pp. 1-32, XP002461480.

S. Tomic et al. "ASON and GMPLS—Overview and Comparison" Photonic Network Communications, vol. 7, No. 2, Mar. 2004, pp. 111-130, XP002461481 The Netherlands.

International Search Report from International Patent Application PCT/CN2005/001942.

Zheng Xiaoping et al., "Hierarchical Routing System in Automatically Switched Optical Network and Realization Methods," Telecom Science, p. 29-32, Aug. 2003.

Foreign communication from a counterpart application, PCT application PCT/CN2005/001942, English Translation Written Opinion dated Mar. 2, 2006, 3 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Sub-type             |            Length             |
+-+-+-+-+-+-+-+-+-+-+-+-+-+-+-+-+-+-+-+-+-+-+-+-+-+-+-+-+-+-+-+-+
|                    RC ID of the highest hierarchy              |
+-+-+-+-+-+-+-+-+-+-+-+-+-+-+-+-+-+-+-+-+-+-+-+-+-+-+-+-+-+-+-+-+
|                           --------                             |
+-+-+-+-+-+-+-+-+-+-+-+-+-+-+-+-+-+-+-+-+-+-+-+-+-+-+-+-+-+-+-+-+
|                    RC ID of the lowest hierarchy               |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|N   C-Type    |      Class      |              Length           |
+-+-+-+-+-+-+-+-+-+-+-+-+-+-+-+-+-+-+-+-+-+-+-+-+-+-+-+-+-+-+-+-+
|                    RC ID of the highest hierarchy              |
+-+-+-+-+-+-+-+-+-+-+-+-+-+-+-+-+-+-+-+-+-+-+-+-+-+-+-+-+-+-+-+-+
|                                                                |
+-+-+-+-+-+-+-+-+-+-+-+-+-+-+-+-+-+-+-+-+-+-+-+-+-+-+-+-+-+-+-+-+
|                    RC ID of the lowest hierarchy               |
+-+-+-+-+-+-+-+-+-+-+-+-+-+-+-+-+-+-+-+-+-+-+-+-+-+-+-+-+-+-+-+-+
```

METHOD OF IDENTIFYING DOMAIN-TO-DOMAIN LINK BASED ON AUTOMATICALLY SWITCHED OPTICAL NETWORK

FIELD OF THE INVENTION

The present invention relates to ASON (Automatically Switched Optical Network) technologies, in particular, to an identification method of domain-to-domain link based on ASON.

BACKGROUND OF THE INVENTION

An optical network system mainly includes SDH (Synchronous Digital Hierarchy)/Sonet (Synchronous Optical Network), wavelength network and so on. Conventional optical network is a network system based on centralized management, and information intercommunication is performed via permanent connection between the nodes in the network. Permanent connection means that the service switching relations between all the nodes are manually configured in a conventional optical network system, and once this configuration is determined, it will generally not be modified in a large-scale optical network system; such a service switching relation between nodes is referred to as permanent connection.

Connection path in permanent connection mode is pre-calculated by the management plane according to the requirements of service switching between the nodes and the utilization of network resource etc.; then a cross-connection command is sent to each node via a network management interface along the connection path obtained from the calculation, and a connection path is established finally. Permanent connection mode is effectively used in the early stage of the development of optical network due to its advantages such as simple design and low cost. However, since manual work or network management system is needed during the establishment, maintenance and dismantlement process of a connection path in permanent connection mode, the operation process is very tiresome. As the data traffic of a network system increases continuously, this connection mode can no longer meet the requirements of dynamic flexibility of optical network systems.

Therefore, ITU-T (ITU-Telecommunication Standardization Sector) puts forward an ASON (Automatically Switched Optical Network) architecture. Two novel connection modes are introduced into ASON: soft permanent connection mode and switched connection mode. Wherein, the soft permanent connection mode is initiated by management plane, in which the connection path is established in control plane; the switched connection mode is initiated by user equipment, in which the connection path is established in control plane.

Wherein, the main characteristic of ASON architecture lies in that a control plane (control plane is a control communication network based on IP technology, and routing protocol, signaling protocol and so on can be operated on this network system to realize the automatic control on various services) is added in a conventional optical network, and a switched connection concept is put forward. Thus, a node in an ASON obtains the connection relation with other nodes via the partial-link detection technology at first, then issues its node and link status via the control plane and receives the status information issued by other nodes in the network, thus a "network map" describing the accurate topology information of the whole network can be obtained by each node in the network finally. In this "network map", various information, such as node, link and resource, etc., is included. When a user equipment or a management plane requires a node to establish a connection path, the corresponding node obtains a feasible path with the "network map" information obtained and according to a certain routing algorithm (usually, CSPF (Constrained Shortest Path First) algorithm will be selected), then each node on the path is driven to establish a cross-connection relation with a signaling protocol (usually, RSVP-TE (Resource Reservation Protocol-Traffic Engineering) will be selected), thus a connection path will be established. When a network connection is dynamically established, dismantled or when link resource is changed due to a failure, the corresponding node will issue the information such as node and link status, etc. after the change, so that the inter-node "network map" can be updated synchronously.

In ASON, each node collects the "network map" information with Link Status Protocol which is applicable in a small-scale network. But, as the scale of ASON gets larger and larger, the network will be divided into a plurality of small control domains logically. As the network scale is further enlarged, each control domain divided is further divided, and finally a hierarchical ASON is formed.

The process of establishing a connection path in a control domain after the ASON is divided into a plurality of control domains is the same as that before the ASON is divided. However, when an end-to-end connection path across a plurality of control domains is to be established, a cross-domain connection path cannot be computed or established only according to the "network map" information in the current domain, because each control domain is independent to each other, and the nodes in each control domain only know the "network map" information in the current domain, rather than the "network map" information in other control domains. Therefore, in a hierarchical ASON, hierarchical routing is usually employed to establish a cross-domain connection path. During the process in which a cross-domain connection path is established using hierarchical routing, for each high layer control domain, the control domain of the lower layer is abstracted as a node, and the domain-to-domain links between the control domains of the lower layer are regarded as links between abstract nodes, and the intra-domain links between the internal nodes of a control domain of the lower layer is invisible to the control domain of high layer. In the control domain of high layer, the similar process as mentioned above is employed to diffuse the status information of links between each abstract node, so that each abstract node in the control domain of the current layer can obtain the network topology information of the current layer, i.e., the "network map" information of the current layer.

As the hierarchical ASON technology becomes more and more mature, it has been a problem as to how to identify the domain-to-domain link between each control domain of each layer, so as to diffuse the domain-to-domain link information of the current layer to the control domain of the higher layer correctly.

The inventor has put forward a method for identifying domain-to-domain links between each control domain of ASON in CN Application No. 200410073746.1, titled "A Method For Finding A Link Type", the main process of which is shown as follows:

The identifier of the control domain to which a network node pertains is set in the node;

Each node sends the identifier of the control domain to which it pertains to an opposite terminal node during the negotiation process to establish a control channel between the nodes;

After each node receives the identifier of the control domain to which the opposite terminal node pertains sent by the opposite terminal node, it determines whether the identifier of the control domain to which the opposite terminal node pertains is the same as the identifier of the control domain to which the node itself pertains; if yes, it is determined that the node belongs to the same control domain as the opposite terminal node, and the link between the node and the opposite terminal node is an intra-domain link; otherwise, it is determined that the node and the opposite terminal node belong to different control domains, and the link between the node and the opposite terminal node is a domain-to-domain link; and Each node rep orts the above obtained link type information to the routing protocol.

Figure 1:
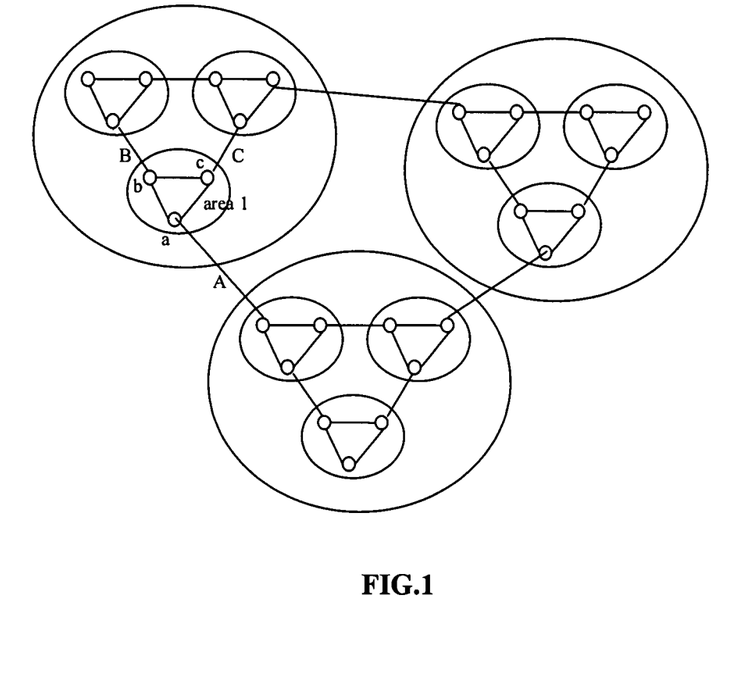
FIG. 1 is a schematic diagram showing the simple topology in which the method of the prior application is used to determine whether a link is a domain-to-domain link.

Referring to FIG. 1, it is a schematic diagram showing the simple topology in which the method of the prior application is used to determine whether a link is a domain-to-domain link. As shown in FIG. 1, area 1 represents a control domain of the bottom layer, wherein area 1 is consisted of node a, node b and node c, and it can be found that link A is a domain-to-domain link with the method of the prior application filed by the applicant. At the same time, the information about domain-to-domain link B and domain-to-domain link C can also be obtained by node a from the node status information diffused from node b and node c. Thus, in addition to the intra-domain links between ab, ac and bc, three domain-to-domain links A, B and C can also be obtained on node a in area1. Similarly, the corresponding link type information can also be obtained on node b and node c in area1.

However, in a hierarchical ASON (more than 2 hierarchies), it is required not only to identify the domain-to-domain links in the bottom layer between node a, node b and node c shown in FIG. 1, but also to identify the domain-to-domain link information of the abstract node abstracted by the control domain area1 in which node a, node b and node c exist in the control domain of the higher layer. As shown in FIG. 1, there are three links A, B and C in the control domain of the higher layer for the abstract node abstracted by area1, wherein in the control domain of the higher layer, link B and link C are intra-domain links, and link A is a domain-to-domain link. However, in the method of the prior application filed by the applicant, only the domain-to-domain link and the intra-domain link types for each node in the control domain of the bottom layer can be identified, but the domain-to-domain links between abstract nodes in each layer of control domain in a hierarchical ASON with more than two hierarchies cannot be identified. Therefore, in a hierarchical ASON with more than two hierarchies, the control domain of the lower layer cannot identify the domain-to-domain link information between the nodes in the control domain of the current layer, so the domain-to-domain link information between each node of the current layer cannot be diffused to the control domain of the higher layer.

SUMMARY OF THE INVENTION

The embodiments of the present invention are to provide an identification method of domain-to-domain link based on ASON, so that control domain of each layer in a hierarchical ASON can identify the domain-to-domain link between the nodes in the present layer.

The embodiments of the invention provide an identification method of domain-to-domain link based on ASON, which includes:

storing a first route control ID of a first abstract node in a higher layer network abstracted by a first control domain, and a second route control ID of a second abstract node in a further higher layer network abstracted by the second control domain in which the first abstract node exists, and the like, until an N-th route control ID of a corresponding N-th abstract node in the highest layer network is stored, wherein the N denotes the number of network layers minus one;

obtaining the route control ID of the abstract node in each network layer stored in an opposite terminal node of a link by exchanging the route control ID of the abstract node in each network layer;

comparing the route control ID of the abstract node in each network layer stored locally with the route control ID of the abstract node in a corresponding network layer stored in the opposite terminal node respectively, and determining whether the link with the opposite terminal node is a domain-to-domain link according to the comparing result.

Wherein:

the comparing process further comprises: comparing the route control ID of the abstract node in each network layer stored locally with the route control ID of the abstract node in the corresponding network layer stored in the opposite terminal node respectively, to obtain the highest layer of the layers with different comparing results, and taking the route control ID of the abstract node in the obtained highest network layer which is stored in the opposite terminal node as a high layer opposite terminal address of the link with the opposite terminal node;

the determining process further comprises: if there is no route control ID that is the same as the high layer opposite terminal address in the first control domain, it is determined that the link with the opposite terminal node is a domain-to-domain link.

Or, the locally stored route control ID of the abstract node in each network layer is compared with the route control ID of the abstract node in a corresponding network layer stored in the opposite terminal node respectively, if same ID exists, the link with the opposite terminal node in the lower layer of the layer in which the same ID exists is an intra-domain link; otherwise, the link is a domain-to-domain link.

Or, the locally stored route control ID of the abstract node in a network layer is compared with the route control ID of the abstract node in the corresponding network layer stored in the opposite terminal node respectively, if they are same, the link with the opposite terminal node in the lower layer is an intra-domain link; otherwise, the link is a domain-to-domain link.

The abstracting process specifically comprises:

each abstract node in the highest layer network packaging its route control ID in the first layer of a hierarchical list subtype length value respectively, and diffusing the packaged hierarchical list subtype length value downward respectively to a speaker node in a corresponding control domain of the lower layer network;

the speaker node in a control domain of the lower layer network diffusing the hierarchical list subtype length value sent from the abstract node in high layer network to each abstract node in the current control domain; each abstract node in the current control domain extracting and storing the route control ID carried in the first layer of the hierarchical list subtype length value it receives, packaging its route control ID in the second layer of the hierarchical list subtype length value it receives, and diffusing the packaged hierarchical list subtype length value to the speaker node in its control domain in intra-domain diffusion mode; the speaker node diffuses the hierarchical list subtype length value received downward to a speaker node in the corresponding control domain of the further lower layer network;

the above process continues by analogy, until it's diffused downward to the bottom network layer, then the process ends.

Wherein, the intra-domain diffusion of hierarchical list subtype length value is performed between each node and the speaker node in each control domain via a link status advertisement message.

Wherein, each node in each network layer also stores its own route control ID.

The route control ID of the abstract node in each network layer is packaged successively in a link management protocol message hierarchically for exchanging with the opposite terminal node of the link.

Wherein, in the comparing process mentioned above:

begin with the highest network layer, the route control ID of the abstract node stored locally is compared with the route control ID of the abstract node stored in the opposite terminal node layer by layer, until a layer with different comparing result is found, and the route control ID of the abstract node in this network layer which is stored in the opposite terminal node is taken as the high layer opposite terminal address of the link with the opposite terminal node.

It is determined by the speaker node whether a route control ID that is the same as the high layer opposite terminal address exists in the control domain to which the speaker node pertains.

The route control IDs of abstract nodes in each network layer and the high layer opposite terminal addresses obtained are diffused to the speaker node in the current domain in intra-domain diffusion mode via a link status advertisement message.

The method further comprises: the speaker node determining whether the domain-to-domain link information can be obtained, if yes, obtaining the domain-to-domain link information and diffusing the domain-to-domain link information obtained to the high layer network; otherwise, no link information is diffused upward.

The above link is a traffic engineering link.

The invention can attain the following beneficial effects:

In the identification method of domain-to-domain link based on ASON according to the embodiments of the invention, the RC IDs of related abstract nodes in the higher layer to the highest layer network are stored on the nodes of each network layer in an ASON, and the RC ID information stored on each node in the current layer is exchanged among the nodes in the current layer, thus the node can find the high layer opposite terminal address of the link between the node and the opposite terminal node by determining whether the RC IDs of related abstract nodes in each layer stored locally are the same as the RC IDs of related abstract nodes in the corresponding layer which are stored in the opposite terminal node of the link, and it is determined that the link between the node and the opposite terminal node is a domain-to-domain link when determining that no RC ID that is the same as the aforementioned high layer opposite terminal address can be found in its control domain. Thus, the control domain of each network layer in an ASON can identify the domain-to-domain link information between nodes of the current layer network. Moreover, the domain-to-domain link information identified in each network layer can also be diffused upward to the higher layer network. As a result, the establishing process of hierarchical routing can be simplified.

DETAILED DESCRIPTION OF THE EMBODIMENTS

Since domain-to-domain links and intra-domain links of each network layer cannot be identified in an ASON with more than two layers in a prior application filed by the applicant titled "A Method For Finding A Link Type", the identification method of domain-to-domain link based on ASON according to an embodiment of the invention is an improved technical solution for solving the problems of the prior application. In the embodiments of the invention, the control domain of each network layer can identify the link type (including domain-to-domain link and intra-domain link) between the nodes of the current layer.

Embodiments of the identification method of the domain-to-domain link based on ASON according to the invention will now be illustrated in detail in conjunction with the drawings.

During the process of implementing the identification method of the domain-to-domain link based on ASON according to an embodiment of the invention, TE (Traffic Engineering) link information will not be diffused upward before a node in each network layer obtains the type of the link between the node and the opposite terminal node, that is, the link type information will not be diffused to the corresponding control domain of the higher layer network (Feed Up). In an ASON, TE link information is diffused in the bottom network layer with an intra-domain routing protocol, and at this point, it cannot be determined whether the link between any two nodes is a domain-to-domain link or an intra-domain link, so it cannot be determined whether the link between two nodes is to be diffused upward (Feed Up). In such a state, the upward diffusion of TE link information should not be performed so as to avoid mass data oscillation (if an intra-domain link is also diffused upward at this point, it can be determined in a subsequent process that the link is an intra-domain link and then it will be deleted, but data oscillation may occur during the diffusion process in which a large number of intra-domain links of the low layer network are diffused to the higher layer network).

Figure 2:
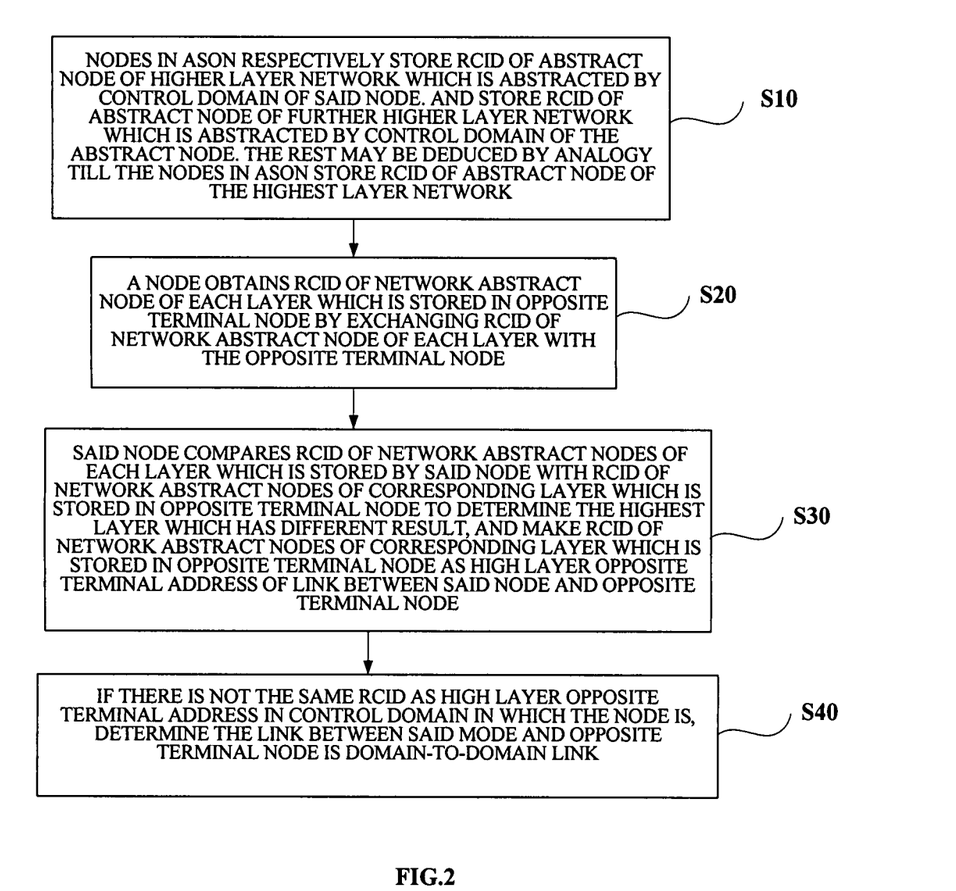
FIG. 2 is a flow chart showing the main principle of the identification method of domain-to-domain link based on ASON according to an embodiment of the invention.

Referring to FIG. 2, which is a flow chart showing the main principle of the identification method of domain-to-domain link based on ASON according to an embodiment of the invention, the main process is shown as follows:

Step S10: each node in an ASON respectively stores the RC ID (Route Control ID) of an abstract node in the higher layer network abstracted by the control domain in which the node exists, and the RC ID of an abstract node in the further higher layer network abstracted by the control domain in which the abstract node in the higher layer network exists, and the like, until the RC ID information of an abstract node in the highest layer network is stored;

Wherein, the detailed process in which each node stores the RC ID of the abstract node in each layer above the layer in which the node exists is as follows:

Each abstract node in the highest layer network in an ASON packages its RC ID in the first layer of a hierarchical list sub-TLV (Type Length Value), and diffuses the packaged hierarchical list sub-TLV downward to a speaker node in the corresponding control domain in the lower layer network respectively;

The speaker node in each control domain in the lower layer network diffuses the hierarchical list sub-TLV sent from the abstract node of high layer network to each abstract node in the current domain in intra-domain diffusion mode; each abstract node in the current domain extracts and stores the RC ID carried in the first layer of the hierarchical list sub-TLV it receives; and the abstract node diffuses the packaged hierarchical list sub-TLV to the speaker node of its control domain in intra-domain diffusion mode after packaging its RC ID in the second layer of the hierarchical list sub-TLV, and the speaker node diffuses the hierarchical list sub-TLV received downward to the speaker node in the corresponding control domain of the further lower layer network;

The subsequent operations are conducted in the similar way.

Until the speaker node in each control domain of the last but one layer network in an ASON diffuses the hierarchical list sub-TLV downward to the speaker node in the corresponding control domain of the bottom layer network respectively, the speaker node in each control domain of the bottom layer network diffuses the hierarchical list sub-TLV received to each intra-domain node in intra-domain diffusion mode respectively. Other nodes in each control domain of the bottom layer network extract the RC ID information carried in each layer of the hierarchical list sub-TLV received respectively, and store the extracted RC ID information layer-by-layer, then the process ends.

Figure 3:
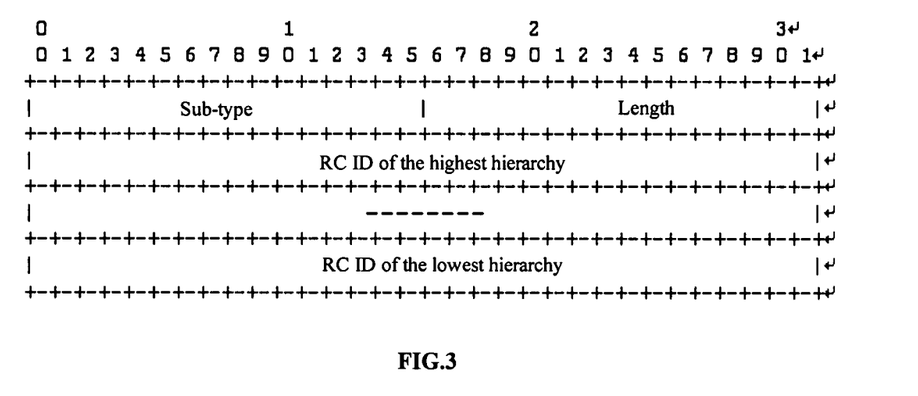
FIG. 3 is a schematic diagram showing the information format of hierarchical list sub-TLV in the identification method of domain-to-domain link based on ASON according to an embodiment of the invention.

Refer to FIG. 3 for the information format of hierarchical list sub-TLV in the above process. Wherein, TLV is a packaging format of message information, the first field of which represents information subtype (Sub-type), the second field of which represents the length value (Length) of the information packet, and the third field of which represents the information content, and the RC IDs of related abstract nodes from the highest layer of the ASON to the bottom layer can be filled in respectively, so that an RC ID hierarchical list of related abstract nodes in different network layers can be formed. Thus, when the abstract node of the low layer network receives the hierarchical list sub-TLV delivered by related abstract node of the high layer network via the speaker node in its control domain, its RC ID information is added in the lower layer of the hierarchical list sub-TLV received, and then the processed hierarchical list sub-TLV is diffused downward (Feed Down) via the speaker node in its control domain. Therefore, the RC ID list of related abstract nodes in each layer above the current network layer can be obtained by the node in the current network layer. After the above process is performed for each network layer, all the nodes of the whole network can obtain the RC ID hierarchical list of related abstract nodes in each network layer above the network layer in which the nodes of the whole network exist.

Wherein, in an ASON, a speaker node is a special node in which an instance of routing protocols in the high layer network and an instance of routing protocols in the current layer network can be operated simultaneously. Therefore, the speaker node can diffuse information upward and downward in an ASON. Moreover, the intra-domain diffusion of hierarchical list sub-TLV between the speaker node and other nodes in its control domain is performed via LSA (Link Status Advertisement).

Of course, when the RC ID hierarchical list of related abstract nodes in each layer that is above a current layer is stored in the nodes in each network layer, RC ID information of the nodes can also be stored in the bottom layer of the list.

Figure 4:
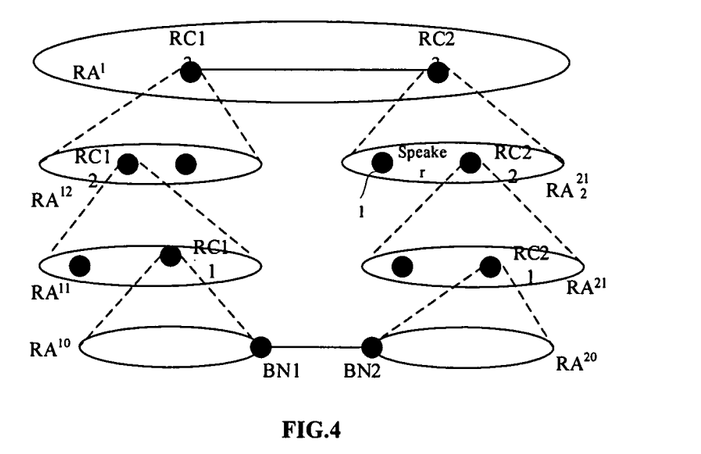
FIG. 4 is a schematic diagram showing the process in which the RC ID of an abstract node in the high network layer is diffused layer-by-layer downward to the corresponding control domain of a lower layer network in the identification method of domain-to-domain link based on ASON according to an embodiment of the invention.

Referring to FIG. 4, it is a schematic diagram showing the process in which the RC ID of an abstract node in the high layer network is diffused layer-by-layer downward to the corresponding control domain of a lower layer network in the identification method of domain-to-domain link based on ASON according to an embodiment of the invention; in FIG. 4, it is assumed that the RC ID information of the abstract node RC23 in control domain RA$^1$ of the high layer network abstracted by control domain RA$^{212}$ of the current layer is known on speaker node 1 of control domain RA$^{212}$, and Value term of the hierarchical list sub-TLV formed in speaker node 1 may be filled in with one item, i.e., the RC ID of the abstract node RC23 in control domain RA$^1$ of the high layer network (for marking an routing instance of the abstract node RC23); or it may also be filled in with two items, i.e. the RC ID of the abstract node RC23 in control domain RA$^1$ of high layer network and the RC ID of speaker node 1 itself, and the hierarchical list sub-TLV formed by speaker node 1 can be placed in the Node Address TLV of speaker node 1, or in other user-defined hierarchical list sub-TLV of node level, for intra-domain information diffusion. Thus, the RC ID of the abstract node RC23 in control domain RA$^1$ of the high layer network can be obtained, when other nodes in control domain RA$^{212}$ receive the hierarchical list TLV sent from speaker node 1. The same process can also occur between the abstract node RC22 and the abstract node RC21 (wherein, it is assumed that RC21 is the speaker node in control domain RA$^{21}$). At this point, the RC ID hierarchical list of related abstract nodes in each layer above the current network layer stored in the abstract node RC21 includes the RC ID of RC23 and the RC ID of RC22, and it can also include the RC ID of RC21 itself.

Similarly, the process reaches node BN2 of the bottom layer finally, and the RC ID hierarchical list of related abstract nodes in each layer that is above current network layer stored therein includes the RC ID of RC23, the RC ID of RC 22 and the RC ID of RC 21, and it may also include the RC ID of BN2 itself.

Similarly, the RC ID hierarchical list of related abstract nodes in each above network layer stored in node BN1 includes the RC ID of RC13, the RC ID of RC12 and the RC ID of RC11, and it may also include the RC ID of BN1 itself.

Figure 5:
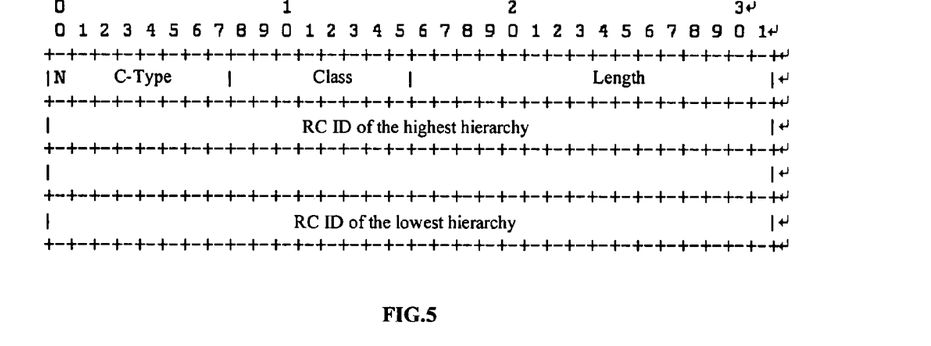
FIG. 5 is a schematic diagram showing the information format of the node hierarchical list object in the identification method of domain-to-domain link based on ASON according to an embodiment of the invention.

Step S20: any node in any network layer obtains the RC ID of the abstract node in each network layer which is stored in an opposite terminal node, by exchanging the RC ID of the abstract node in each network layer stored locally with the RC ID of the abstract node in each network layer stored in the opposite terminal node of a link; wherein, the node can interact with the opposite terminal node of the link by packaging the RC ID of the abstract node in each network layer stored locally successively in an LMP (Link Management Protocol) message hierarchically. The process is as follows: add a Node Hierarchical List Object to the LMP message, for storing an RC ID hierarchical list of the abstract node in each network layer; FIG. 5 can be referred for the specific information format of the Node Hierarchical List Object, including C-Type domain, Class domain, Length domain, and Value domain for carrying the RC IDs of abstract nodes in each network layer.

Step S30: the node compares the RC ID of the abstract node in each network layer stored locally respectively with the RC ID of the abstract node in the corresponding network layer which is stored in the opposite terminal node layer-by-layer, so that the highest layer of the layers with different comparative results is obtained, and the RC ID of the abstract node in the highest network layer which is stored in the opposite terminal node is taken as the high layer opposite terminal address of the link (Link ID) between the node and the opposite terminal node. Refer to FIG. 4 again, the high layer opposite terminal address (Link ID) means the opposite terminal address of TE link, and in the hierarchical routing of ASON, "addresses of both ends of a link" has a complex meaning. Taking the link from node BN1 to node BN2 in FIG. 4 as an example, since control domain $RA^{10}$ of the bottom layer network is abstracted as the abstract node RC11 in control domain $RA^{11}$ of the high layer network, and control domain $RA^{20}$ of the bottom layer network is abstracted as the abstract node RC21 in control domain $RA^{21}$ of the high layer network, the addresses of both ends of the link from node BN1 to node BN2 in the second layer from the bottom of network are RC11 and RC21 respectively. During the continuous abstracting process toward the higher layer network, the link will become an intra-domain link in control domain $RA^1$, and at this point, the addresses of both ends of the link are RC13 and RC23 respectively, wherein the high layer opposite terminal address of link BN1-BN2 is RC23.

Figure 6:
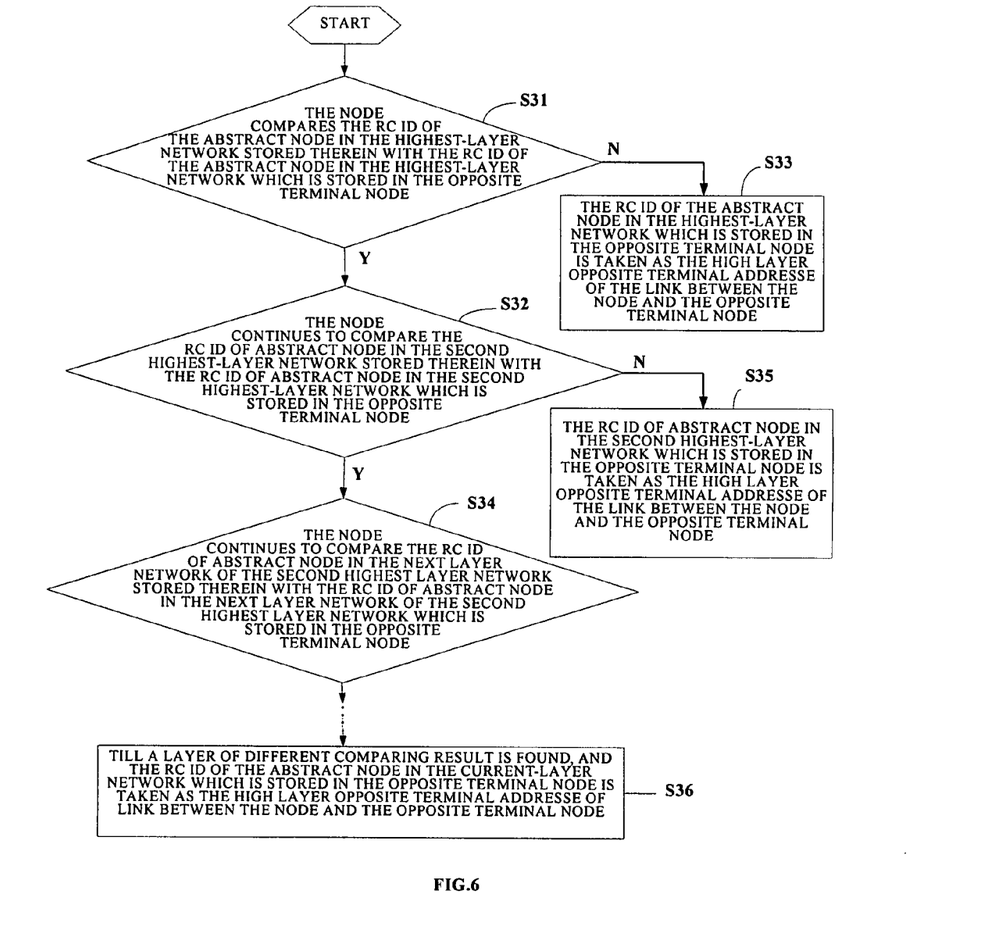
FIG. 6 is a flow chart showing the process in which the RC ID in each layer stored locally is compared with the RC ID in each layer stored in the opposite terminal node respectively and the high layer opposite terminal address of the link between the node and the opposite terminal node is obtained, according to the identification method of domain-to-domain link based on ASON according to an embodiment of the invention.

Referring to FIG. 6, it is a flow chart showing the process in which the RC ID of each layer stored locally is compared with the RC ID of each corresponding layer which is stored in the opposite terminal node respectively, and the high layer opposite terminal address of the link between the node and the opposite terminal node is obtained in the identification method of domain-to-domain link based on ASON according to an embodiment of the invention. The process includes:

Step S31: first of all, the node compares the RC ID of the abstract node in the highest layer network stored locally with the RC ID of the abstract node in the highest layer network which is stored in the opposite terminal node, if they are the same, then turn to Step S32; otherwise, turn to Step S33;

Step S32: the node continues to compare the RC ID of the abstract node in the second highest layer network stored locally with the RC ID of the abstract node in the second highest layer network which is stored in the opposite terminal node, if they are the same, turn to Step S34; otherwise, turn to Step S35;

Step S33: the RC ID of the abstract node in the highest layer network which is stored in the opposite terminal node is taken as the high layer opposite terminal address (Link ID) of the link between the node and the opposite terminal node;

Step S34: the node continues to compare the RC ID of the abstract node in the lower layer network of the second highest layer network stored locally with the RC ID of the abstract node in the lower layer network of the second highest layer network which is stored in the opposite terminal node, and so on, until a layer with different comparing result is found in Step S36, and the RC ID of the abstract node in the network layer with different comparing result, which is stored in the opposite terminal node, is taken as the high layer opposite terminal address (Link ID) of the link between the node and the opposite terminal node;

Step S35: the RC ID of the abstract node in the second highest layer network which is stored in the opposite terminal node is taken as the high layer opposite terminal address (Link ID) of the link between the node and the opposite terminal node.

In conclusion, the method for obtaining the high layer opposite terminal address is as follows: if there are list items with the same RC ID value in the RC ID hierarchical list stored in the local node and the RC ID hierarchical list stored in the opposite terminal node, then find the list item representing the lowest layer in all the same list items, then find the list item which is one layer lower than the lowest layer represented by the list item with the same RC ID value according to the layer of the aforementioned list item, and the hierarchical list item in the RC ID hierarchical list stored in the opposite terminal node is the high layer opposite terminal address (Link ID) of the link between the node and the opposite terminal node; if no list items with the same RC ID value are found in the RC ID hierarchical list stored in the local node and the RC ID hierarchical list stored in the opposite terminal node, then the RC ID stored in the list item of the highest layer in the RC ID hierarchical list stored in the opposite terminal node is taken as the high layer opposite terminal address (Link ID) of the link between the node and the opposite terminal node to be found. Therefore, the high layer opposite terminal address of a link is the RC ID of the opposite terminal abstract node when the link becomes an intra-domain link for the first time during the upward diffusion process of the link.

Now, it will be illustrated how to search the high layer opposite terminal address of a node by way of example. Referring to FIG. 4 again, in node BN1 and node BN2, the RC ID hierarchical list of related abstract nodes in each layer above the network layer in which BN1 and BN2 exist can be obtained and stored respectively according to the aforementioned process, wherein it's RC13-RC12-RC11-BN1 corresponding to node BN1, and RC23-RC22-RC21-BN2 corresponding to node BN2. Then, the RC ID hierarchical list stored is packaged in an expanded LMP message and diffused to the opposite terminal node of the link. Thus, node BN1 and node BN2 can obtain the RC ID hierarchical list information stored locally and the RC ID hierarchical list information stored in the opposite terminal node of the link simultaneously. It is assumed that on node BN1, no same RC IDs are found by comparing the RC ID hierarchical lists stored respectively on both ends of a link, then it indicates that link BN1-BN2 becomes an intra-domain link only in the network layer in which control domain $RA^1$ exists, and in a network layer lower than this layer, the links between BN1-BN2 are all domain-to-domain links.

Figure 7:
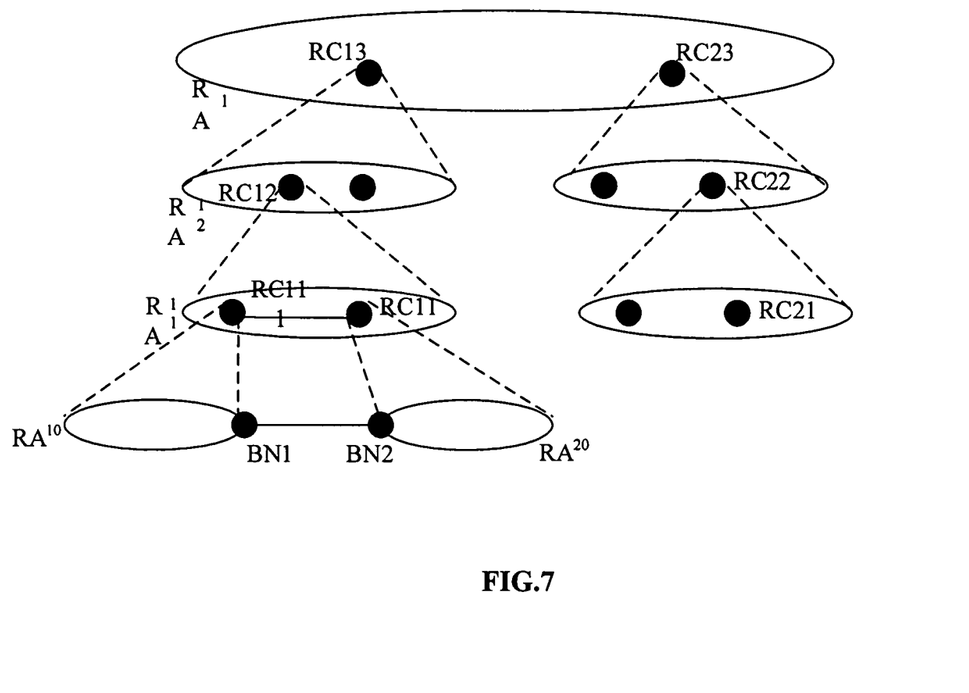
FIG. 7 is a schematic diagram showing an embodiment in which the high layer opposite terminal address of a link is searched in the identification method of domain-to-domain link based on ASON according to the invention.

As another example, referring to FIG. 7, it is a schematic diagram showing one embodiment in which the high layer opposite terminal address of a link is searched in the identification method of domain-to-domain link based on ASON according to an embodiment of the invention. In FIG. 7, the abstract node RC111 abstracted by control domain $RA^{10}$ in the higher layer network and the abstract node RC11 abstracted by control domain $RA^{20}$ in the higher layer network belong to control domain $RA^{11}$ at the same time. It can be seen from FIG. 7 that the high layer opposite terminal address of link BN1-BN2 is RC11 for node BN1. The RC ID hierarchical list of the abstract nodes in each network layer stored in node BN1 is RC13-RC12-RC111-BN1, and the RC ID hierarchical list of the abstract nodes in each network layer stored in node BN2 is RC13-RC12-RC11-BN2, after the downward diffusion of the above abstract node RC IDs. The RC ID hierarchical list stored in the link opposite terminal node BN2 can be obtained by node BN1 by packaging the RC ID list stored into an expanded LMP message respectively and exchanging it between node BN1 and BN2. Then it is determined that the list items of top two layers are the same, specifically RC13 and RC12, by comparing each list item value in the RC ID hierarchical list stored in BN1 and the RC ID hierarchical list stored in BN2. Therefore, the list item value of the lower layer of RC12, i.e. RC11, is found in the RC ID hierarchical list stored in opposite terminal node BN2, so RC11 is the high layer opposite terminal address of link BN1-BN2.

Step S40: if it is determined that no RC ID identical to the high layer opposite terminal address determined in Step S30 is found in the control domain in which the node exists, it can be determined that the link between the node and the opposite terminal node is a domain-to-domain link. It can be determined by the speaker node in the control domain in which the node exists whether RC ID identical to the high layer opposite terminal address can be found in the control domain in which the node exists. Each node in a control domain diffuses the RC ID of the abstract node in each network layer stored locally to the speaker node in the current domain with an LSA (Link Status Advertisement) message in intra-domain diffusion mode; subsequently, the speaker node can diffuse the domain-to-domain link information obtained to the corresponding control domain of the higher layer network, so that the establishing process of routing layer in an ASON can be simplified; at the same time, when the speaker node cannot obtain the domain-to-domain link information, the upward diffusion of TE link information will not be performed, so that data oscillation will be prevented between network layers.

In each network layer in an ASON, node information will be diffused in the control domain in intra-domain diffusion mode. For example, referring to FIG. 7 again, since the abstract node RC111 and RC11 are in the same control domain $RA^{11}$, so that the abstract node RC 111 will have the information of the abstract node RC11 after intra-domain information diffusion; however, since node BN1 and the abstract node RC11 are not in the same control domain, so that node BN1 will not have the information of RC 11. Therefore, in node BN1, it can be determined that no RC ID value identical to the high layer opposite terminal address RC11 of link BN1-BN2 can be found in the current control domain $RA^{10}$ and that link BN1-BN2 is a domain-to-domain link, thus the speaker node in control domain $RA^{10}$ diffuses this determined domain-to-domain link information upward; however, in control domain $RA^{11}$, RC ID value identical to the high layer opposite terminal address RC11 of link BN1-BN2 can be found in the abstract node RC111, so link BN1-BN2 is an intra-domain link in control domain $RA^{11}$, and the intra-domain link information may not be further diffused upward during the abstracting process toward the high layer network.

Wherein, all links mentioned above refer to traffic engineering links, i.e. TE links, in ASON.

It can be seen from the above description that, by using the identification method of domain-to-domain link based on ASON according to the embodiments of the invention, it can be determined whether a link between any two nodes in each network layer in an ASON is an intra-domain link or a domain-to-domain link, so that the control domain in each network layer in an ASON can identify a domain-to-domain link and diffuse the domain-to-domain link identified to a higher layer network. As a result, the establishing process of routing hierarchy in an ASON can be simplified.

Usually, if a node does not know its current layer when it determines whether a link is a domain-to-domain link, it cannot determine whether the link in the current layer is a domain-to-domain link or not directly with the information stored in the node itself and the opposite terminal node. In the above embodiment, the situation in which no layer information exists in the node is considered.

If a node knows its current layer when it determines whether a link is a domain-to-domain link, it can compare the RC ID of the abstract node in each network layer stored locally with the RC ID of the abstract node in the corresponding network layer which is stored in the opposite terminal node, and can determine whether the link between the node and the opposite terminal node is a domain-to-domain link according to the comparing result, as long as the node exchanges the RC ID of the abstract node in each network layer that is stored locally with that stored in the opposite terminal node of the link so as to obtain the RC ID of the abstract node in each network layer which are stored in the opposite terminal node. For example:

The node compares the RC ID of the abstract node in each network layer stored locally respectively with the RC ID of the abstract node in the corresponding network layer which is stored in the opposite terminal node. If same RC ID exists, then the link between the node and the opposite terminal node is an intra-domain link in the lower layer of the lowest layer with the same ID; otherwise, it is a domain-to-domain link.

Or, the node compares the RC ID of the abstract node in the current layer network stored locally respectively with the RC ID of the abstract node in the corresponding network layer stored in the opposite terminal node, if they are the same, then the link between the node and the opposite terminal node is an intra-domain link in the lower layer; otherwise, it is a domain-to-domain link in the lower layer.

Taking FIG. 4 as an example, if it is to be determined whether the link between BN1 and BN2 is a domain-to-domain link or an intra-domain link in the bottom layer, the RC IDs of abstract nodes in the higher layer network of BN1 and BN2, i.e. RC11 and RC21, are compared; they are different, so the link between BN1 and BN2 is a domain-to-domain link in the bottom layer.

Additional advantages and modifications will readily occur to those skilled in the art. The invention is not limited to the specific details and representative embodiments shown and described above. Various variations and modifications can be made without departing from the spirit or scope of the invention as defined by the appended claims and their equivalents.

The invention claimed is:

1. A method of identifying domain-to-domain link based on an automatically switched optical network, wherein the automatically switched optical network includes N network layers, wherein a highest network layer of the automatically switched optical network is indicated as a first network layer, and wherein a lowest network layer of the automatically switched optical network is indicated as an Nth network layer, wherein N is an integer larger than 1, comprising:

abstracting a first control domain in an Mth network layer as a first abstract node in an M−1th network layer, subtracting 1 from M, and repeating the step of abstracting, until M is equal to 2, and storing route control IDs of abstract nodes in a first node that is in the first control domain of the Mth network layer, wherein M is an integer less than or equal to N;

obtaining, by the first node, route control IDs of the abstract nodes stored in a second node connected to the first node via a link by exchanging a route control ID of the abstract node in each network layer;

comparing, by the first node, the route control ID of the abstract node in each network layer stored locally with the route control ID of the abstract node in a peer network layer stored in the second node respectively, to obtain a highest layer of the layers with different route control IDs, and taking the route control ID of the abstract node in the highest layer stored in the second node as a high layer opposite node address of the link; and if no route control ID in the first control domain is the same as the high layer opposite node address, determining that the link is a domain-to-domain link, wherein a speaker node in the first control domain determines whether a route control ID that is the same as the high layer opposite node address in the first control domain.

2. The method of identifying domain-to-domain link based on automatically switched optical network according to claim 1, wherein the abstracting process specifically comprises:

each abstract node in the first network layer packaging its route control ID in first layer of a hierarchical list subtype length value respectively, and diffusing the packaged hierarchical list subtype length value downward respectively to a first speaker node in a corresponding control domain of the second network layer;

the first speaker node in the control domain of the second network layer diffusing the hierarchical list subtype length value sent from the abstract node in the first network layer to each abstract node in the control domain of the second network layer; each abstract node in the control domain of the second network layer extracting and storing the route control ID carried in the first layer of the hierarchical list subtype length value received, packaging its route control ID in second layer of the hierarchical list subtype length value to the first speaker node in intra-domain diffusing mode; the first speaker node diffusing the hierarchical list subtype length value received downward to a second speaker node in a corresponding control domain of the third network layer; and repeating the steps of packaging and diffusing, until the hierarchical list subtype length value is diffused downward to the Nth network layer.

3. The method of identifying domain-to-domain link based on automatically switched optical network according to claim 2, wherein the diffusing of hierarchical list subtype length value is performed in the control domain where the speaker node is located via a link status advertisement message by the speaker node in the control domain.

4. The method of identifying domain-to-domain link based on automatically switched optical network according to claim 1, wherein the first node stores its own route control ID.

5. The method of identifying domain-to-domain link based on automatically switched optical network according to claim 1, wherein the first node packages the route control ID of the abstract node in each network layer successively in a link management protocol message hierarchically for exchanging with the second node.

6. A method of identifying domain-to-domain link based on an automatically switched optical network, wherein the automatically switched optical network includes N network layers, wherein a highest network layer of the automatically switched optical network is indicated as a first network layer, and wherein a lowest network layer of the automatically switched optical network is indicated as an Nth network layer, wherein N is an integer larger than 1, comprising:

abstracting a first control domain in an Mth network layer as a first abstract node in an M−1th network layer, subtracting 1 from M, and repeating the step of abstracting, until M is equal to 2, and storing route control IDs of abstract nodes in a first node that is in the first control domain of the Mth network layer, wherein M is an integer less than or equal to N;

obtaining, by the first node, route control IDs of the abstract nodes stored in a second node connected to the first node via a link by exchanging a route control ID of the abstract node in each network layer;

comparing, by the first node, the route control ID of the abstract node in each network layer stored locally with the route control ID of the abstract node in a peer network layer stored in the second node respectively, to obtain a highest layer of the layers with different route control IDs, and taking the route control ID of the abstract node in the highest layer stored in the second node as a high layer opposite node address of the link, wherein the route control IDs of the abstract nodes stored in the first node and the high layer opposite node address are diffused to a speaker node in the first control domain by the first node; and if no route control ID in the first control domain is the same as the high layer opposite node address, determining that the link is a domain-to-domain link.

7. The method of identifying domain-to-domain link based on automatically switched optical network according to claim 1, further comprising: the speaker node in the first control domain determining whether the domain-to-domain link information can be obtained, if yes, obtaining the domain-to-domain link information and diffusing the domain-to-domain link information to the M−1th network layer; otherwise, no link information is diffused upward.

8. The method of identifying domain-to-domain link based on automatically switched optical network according to claim 1, wherein the link is a traffic engineering link.

9. The method of identifying domain-to-domain link based on automatically switched optical network according to claim 1, wherein the route control IDs of the abstract node address are diffused to a speaker node in the first control domain by the first node.

10. The method of identifying domain-to-domain link based on automatically switched optical network according to claim 6, wherein the abstracting process specifically comprises:

each abstract node in the first network layer packaging its route control ID in first layer of a hierarchical list subtype length value respectively, and diffusing the packaged hierarchical list subtype length value downward respectively to a first speaker node in a corresponding control domain of the second network layer;

the first speaker node in the control domain of the second network layer diffusing the hierarchical list subtype length value sent from the abstract node in the first network layer to each abstract node in the control domain of the second network layer; each abstract node in the control domain of the second network layer extracting and storing the route control ID carried in the first layer of the hierarchical list subtype length value received, packaging its route control ID in second layer of the hierarchical list subtype length value to the first speaker node in intra-domain diffusing mode; the first speaker node diffusing the hierarchical list subtype length value received downward to a second speaker node in a corresponding control domain of the third network layer; and repeating the steps of packaging and diffusing, until the hierarchical list subtype length value is diffused downward to the Nth network layer.

11. The method of identifying domain-to-domain link based on automatically switched optical network according to claim 10, wherein the diffusing of hierarchical list subtype length value is performed in the control domain where the speaker node is located via a link status advertisement message by the speaker node in the control domain.

12. The method of identifying domain-to-domain link based on automatically switched optical network according to claim 6, wherein the first node stores its own route control ID.

13. The method of identifying domain-to-domain link based on automatically switched optical network according to claim 6, wherein the first node packages the route control ID of the abstract node in each network layer successively in a link management protocol message hierarchically for exchanging with the second node.

14. The method of identifying domain-to-domain link based on automatically switched optical network according to claim 6, wherein the link is a traffic engineering link.

* * * * *

UNITED STATES PATENT AND TRADEMARK OFFICE
CERTIFICATE OF CORRECTION

PATENT NO.       : 8,589,588 B2                                        Page 1 of 1
APPLICATION NO.  : 11/791154
DATED            : November 19, 2013
INVENTOR(S)      : Wang Li It is certified that error appears in the above-identified patent and that said Letters Patent is hereby corrected as shown below:

Title Page (57) Abstract should read:

"A method of identifying domain-to-domain link based on ASON (Automatically Switched Optical Network), including: storing, by a node in ASON, a route control ID of an abstract node in each high layer network; obtaining, by the node, the route control ID of the abstract node in each network layer stored in an opposite terminal node with an exchanging method; comparing, by the node, the route control ID of the abstract node in each network layer stored locally with the route control ID of the abstract node in a corresponding network layer stored in the opposite terminal node respectively, and determining whether the link between the node and the opposite terminal node is a domain-to-domain link according to the comparing result. With the invention, the control domain of each layer in a hierarchical ASON can identify the domain-to-domain link between the nodes in the present layer."

Title Page 2, References Cited, under Other Publications, the following cited art should read:

"Sanchez-Lopez, S., et al., "PNNI-based control plane for automatically switched optical networks", Journal of Lightwave Technology, XX, XX, vol. 21, No. 11, Nov. 2003, pp. 2673-2682, XP011103945, ISN: 0733-8724.

Tomic, S., et al., "ASON and GMPLS - Overview and Comparison", Photonic Network Communications, vol. 7, No. 2, Mar. 2004, pp. 111-130, XP002461481, The Netherlands.

Xiaoping, Z., et al., "Hierarchical Routing System in Automatically Switched Optical Network and Realization Methods", Telecom Science, pp. 29-32, Aug. 2003."

In the Claims:

Claim 2, Column 13/Line 40 should read: "received, packaging its route control ID in second layer"

Claim 10, Column 14/Line 66 should read: "received, packaging its route control ID in second layer"

Signed and Sealed this
Eleventh Day of March, 2014

Michelle K. Lee
*Deputy Director of the United States Patent and Trademark Office*